United States Patent
Joyce et al.

(10) Patent No.: US 12,468,806 B2
(45) Date of Patent: Nov. 11, 2025

(54) SYSTEM AND METHOD FOR CONVERTING ANTIVIRUS SCAN TO A FEATURE VECTOR

(71) Applicant: Booz Allen Hamilton Inc., McLean, VA (US)

(72) Inventors: Robert J. Joyce, Odenton, MD (US); Edward Simon Pastor Raff, Jamesville, NY (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 154 days.

(21) Appl. No.: 18/475,601

(22) Filed: Sep. 27, 2023

(65) Prior Publication Data
US 2024/0303331 A1 Sep. 12, 2024

Related U.S. Application Data

(60) Provisional application No. 63/489,445, filed on Mar. 10, 2023.

(51) Int. Cl.
*G06F 21/56* (2013.01)
*G06N 3/0442* (2023.01)

(52) U.S. Cl.
CPC ......... *G06F 21/561* (2013.01); *G06N 3/0442* (2023.01); *G06F 2221/034* (2013.01)

(58) Field of Classification Search
CPC ............ G06F 21/561; G06F 2221/034; G06N 3/0442

(Continued)

(56) References Cited

U.S. PATENT DOCUMENTS

2016/0094574 A1* 3/2016 Hsueh ................. H04L 63/1433 726/23
2016/0307094 A1* 10/2016 Davis .................... G06F 21/564
(Continued)

FOREIGN PATENT DOCUMENTS

EP 3534284 A1 9/2019

OTHER PUBLICATIONS

International Search Report and the Written Opinion of the International Searching Authority, or the Declaration (Forms PCT/ISA/220, PCT/ISA/210 and PCT/ISA/237) issued on Jan. 19, 2024, by the European Patent Office, in corresponding International Application No. PCT/US2023/075210. (13 pages).

*Primary Examiner* — Michael S McNally
(74) *Attorney, Agent, or Firm* — BUCHANAN, INGERSOLL & ROONEY PC

(57) ABSTRACT

Provided are methods, systems, and non-transitory computer-readable media for generating a feature vector for malware, including storing, in memory of a computing device, program code for a trained neural network that produces embedded representations for antivirus scan data; executing, by a processor of the computing device, the program code for the trained neural network to perform the operations of: (a) receiving an antivirus scan report (AVSR) for a malware file; (b) normalizing each label in the AVSR by separating the label into a sequence of tokens including a set of token strings; (c) embedding a first token and plural second tokens to generate an input sequence for the malware file; (d) inputting the input sequence into a neural model for producing antivirus scan data; and (e) outputting the antivirus scan data produced by the neural model as one or more feature vectors.

24 Claims, 7 Drawing Sheets

(58) Field of Classification Search
USPC .......................................................... 726/24
See application file for complete search history.

(56) References Cited

U.S. PATENT DOCUMENTS

| | | | |
|---|---|---|---|
| 2017/0017793 A1* | 1/2017 | Davis | G06N 3/08 |
| 2018/0285740 A1 | 10/2018 | Smyth et al. | |
| 2019/0273509 A1* | 9/2019 | Elkind | H03M 7/4093 |
| 2019/0362074 A1 | 11/2019 | Wang et al. | |

* cited by examiner

SYSTEM AND METHOD FOR CONVERTING ANTIVIRUS SCAN TO A FEATURE VECTOR

CROSS-REFERENCE

This U.S. Non-Provisional application is related to and claims priority to U.S. Provisional Application No. 63/489,445, filed on Mar. 10, 2023, the entire contents of which are incorporated herein by reference.

FIELD

The subject matter disclosed relates generally to machine learning, and, in some embodiments, to methods, systems, and non-transitory computer readable mediums encoded with program code for generating a feature vector for malware and/or data from malware files. In some embodiments, methods, systems, and non-transitory computer readable mediums may relate to building and/or training a neural network model for classifying malware data.

BACKGROUND INFORMATION

Automation may be used in the field of malware analysis (e.g., analysis by antivirus scans, and/or the like) due to manual effort being slow and costly. Malware analysis may be particularly intensive because hundreds of thousands of unique, previously unseen malicious files are observed on a daily basis. The landscape of malicious software and/or malware is constantly changing such that manual analysis cannot keep pace.

Machine learning tasks may be relied upon to provide automation in the field of malware analysis to overcome the problems associated with manual effort. The efficacy of machine learning tasks may be dependent on the types of features that are chosen for machine learning models (e.g., raw file bites, metadata, etc.). In some instances, these features are selected manually, incurring effort and resources to generates features for machine learning models. To improve common tasks of machine learning models (e.g., classification, clustering, nearest-neighbor lookup, etc.), feature extraction and/or selection has been studied.

However, due to the large quantity and variety of malware (e.g., malware data, from antivirus scans, and/or the like), applying manual feature extraction techniques to malware data would be infeasible and would require large amounts of time and resources. Some feature extraction methods may be hindered by static obfuscation, restricted to a single file format, and/or limited in their capacity to identify higher-level malware features. Additionally, antivirus (AV) scan data may be leveraged for feature extraction. Use of AV scan data and/or features extracted from AV scan data may improve some machine learning tasks.

SUMMARY

Embodiments may relate to systems for generating a feature vector for malware. The system may include memory configured to store program code for generating a neural network that produces embedded representations for antivirus scan data. The system may include a receiver configured to receive an antivirus scan report (AVSR) for a malware file. The AVSR may have at least one label including plural tokens that identify an antivirus product and attributes of the malware file. The system may include a processor configured to execute the program code for generating pre-trained AVSR models. The program code may cause the processor device to be configured to normalize each label in the AVSR by separating each label into a sequence of tokens including a set of token strings. The program code may cause the processor device to generate an input sequence for the malware file by embedding a first token and plural second tokens in the AVSR. The first token may identify a start of the input sequence and each second token may correspond to the AVSR of the malware file. The program code may cause the processor device to input the input sequence into a neural model for producing antivirus scan data. The program code may cause the processor device to output the antivirus scan data produced by the neural model as one or more feature vectors.

Embodiments may relate to methods for generating a feature vector for malware. The method may involve storing, in memory of a computing device, program code for a trained neural network that produces embedded representations for antivirus scan data. The method may involve executing, by a processor of the computing device, the program code for the trained neural network. The neural network (e.g., the program code thereof) may cause the computing device to be configured to perform the operation of receiving an AVSR for a malware file. The AVSR may have a label including plural tokens that identify an antivirus product and attributes of the malware file. The neural network may cause the computing device to be configured to perform the operation of normalizing each label in the AVSR by separating each label into a sequence of tokens including a set of token strings. The neural network may cause the computing device to be configured to perform the operation of generating an input sequence for the malware file by embedding a first token and plural second tokens from the AVSR. The first token may identify a start of the input sequence and each second token may correspond to the AVSR of the malware file. The neural network may cause the computing device to be configured to perform the operation of inputting the input sequence into a neural model for producing antivirus scan data. The neural network may cause the computing device to be configured to perform the operation of outputting the antivirus scan data produced by the neural model as one or more feature vectors.

Embodiments may relate to non-transitory computer readable media encoded with program code for generating pre-trained AVSR models. When placed in communicable contact with a computer processor, the program code may cause the processor to be configured to perform an operation of receiving an AVSR for a malware file. The AVSR may have at least one label including plural tokens that identify an antivirus product and attributes of the malware file. The program code may cause the processor to be configured to perform an operation normalizing each label in the AVSR by separating each label into a sequence of tokens including a set of token strings. The program code may cause the processor to be configured to perform an operation of generating an input sequence for the malware file by embedding a first token and plural second tokens from the AVSR. The first token may identify a start of the input sequence and each second token may correspond to the AVSR of the malware file. The program code may cause the processor to be configured to perform an operation of inputting the input sequence into a trained neural model for producing antivirus scan data. The program code may cause the processor to be configured to perform an operation of outputting the antivirus scan data produced by the neural model as one or more feature vectors.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

In accordance with exemplary embodiments of the present disclosure, machine learning model prediction may be used for the analysis of malware files, malware data, and/or antivirus scan data to reduce and/or eliminate a requirement for manual effort. Such embodiments increase the speed of malware analysis and reduce computing resources required to generate feature vectors for malware data. Embodiments of the present disclosure may allow for automated malware analysis and the ability to extract features from hundreds of thousands of unique, previously unseen malicious files that may be observed daily to generate feature vectors. Embodiments and machine learning models trained via the disclosed methods may be able to keep pace with the ever-changing landscape of malicious software in ways that manual analysis cannot accomplish. Embodiments may generate feature vectors for malware that may be used to improve downstream machine learning tasks for malware (e.g., classification, clustering, nearest-neighbor lookup, and/or the like). An improvement in downstream machine learning tasks on malware analysis may produce increased accuracy and/or success of malware detection, leading to increased cyber and data security.

machine learning models trained and/or generated via methods and embodiments of the present disclosure may be used to produce more accurate and robust feature vectors for malware detection. For example, embodiments of the present disclosure may produce feature vectors for malware including embeddings for malware in different file formats, may result in reduced computing resources (e.g., lower storage and computation requirements), and may scale to large datasets of malware data. Such embodiments may also reduce and/or eliminate the requirement of manual input and/or influence (e.g., human input, developer input, etc.). Embodiments and/or methods of the present disclosure may require low storage overhead because of the size of AV scan data compared to raw malicious files. AV scan data may also be easier to obtain for use in training embodiments of the present disclosure because of the availability of AV scan data from various sources. Embodiments of the present disclosure may generate malware feature vectors using only a single Graphics Processing Unit (GPU), reducing computation requirements for feature extraction.

Figure 1:
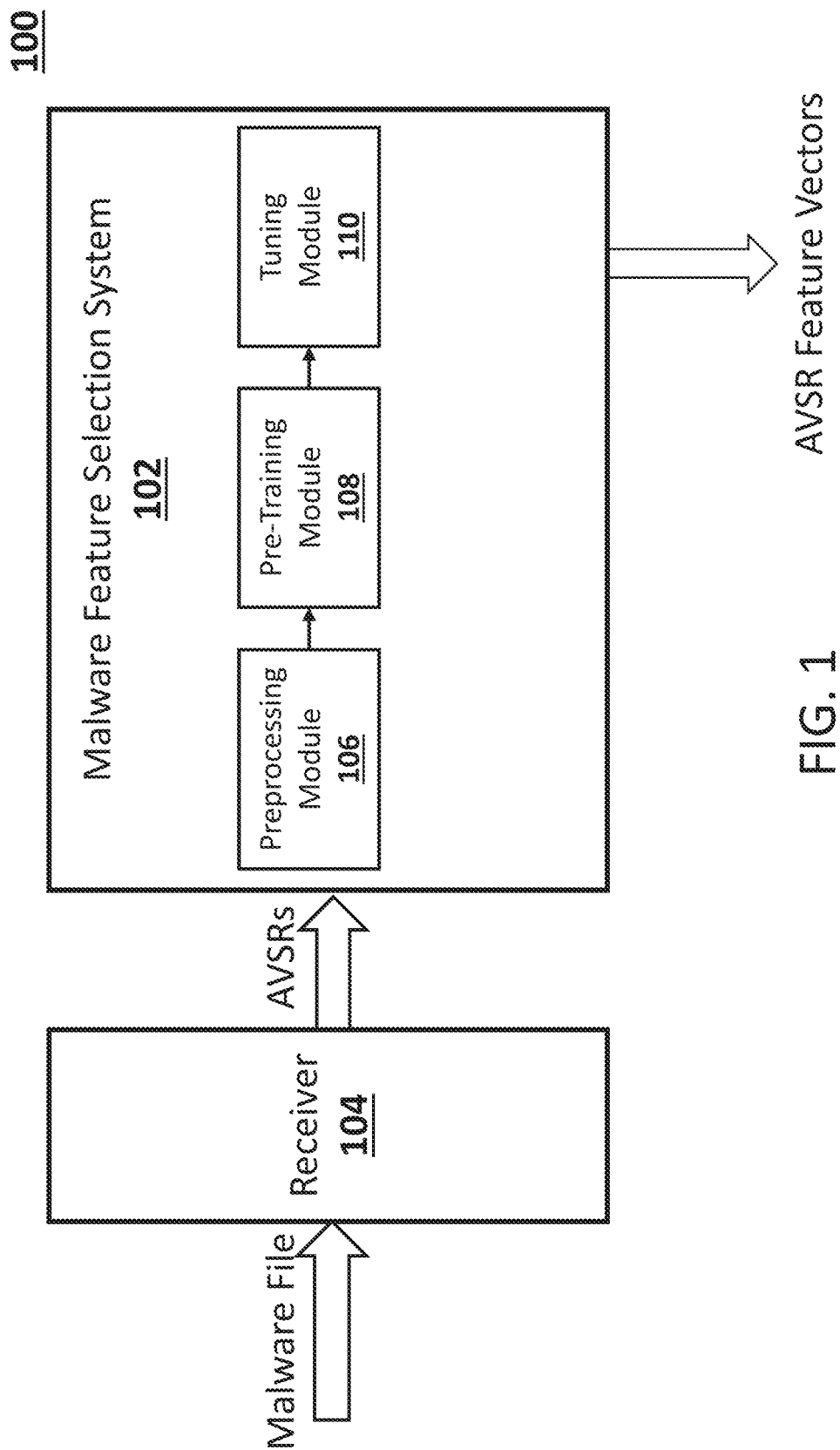
FIG. 1 is a diagram of an exemplary system pipeline operable via program code for generating a feature vector for malware as disclosed herein.

FIG. 1 shows a diagram of an exemplary system pipeline 100 operable via program code (e.g., software instructions executed by a processor) for generating a feature vector for malware as disclosed herein. The various components of FIG. 1 may be implemented in and/or processed by a processor (e.g., a central processing unit (CPU)) and/or on any number of distributed processors (e.g., a distributed computing system) coupled with memory and connected via a communications network. Each of the components shown in FIG. 1 are described in the context of an exemplary embodiment.

As shown in FIG. 1, embodiments relate to a system configured for training machine learning models (e.g., neural models, neural networks, and/or the like) and for generating a feature vector for malware with trained machine learning models. System pipeline 100 may include malware feature selection system 102, receiver 104, preprocessing module 106, pre-training module 108, and fine-tuning module 110.

Malware feature selection system 102 may include one or more computing devices configured to generate a feature vector for malware. Malware feature selection system 102 may include one or more software modules (e.g., preprocessing module 106, pre-training module 108, and/or fine-tuning module 110) for building one or more machine learning models (e.g., neural models) to generate feature vectors based on antivirus data (e.g., antivirus scan reports (AVSRs)). In some embodiments, malware feature selection system 102 may be implemented in a single computing device. Malware feature selection system 102 may be implemented in one or more computing devices (e.g., a group of servers, and/or the like) as a distributed system such that the one or more software modules are implemented on different computing devices. In some embodiments, malware feature selection system 102 may be associated with receiver 104, such that malware feature selection system 102 is connected to receiver 104 as a separate component. Alternatively, malware feature selection system 102 may include receiver 104.

Malware feature selection system 102 may include at least one machine learning model that is trained with AVSRs and generates predictions based on AVSRs as input to the at least one machine learning model. The at least one machine learning models may be trained on datasets (e.g., AVSRs) received from receiver 104. Additionally or alternatively, the at least one machine learning model may generate a prediction output based on testing and/or production datasets (e.g., AVSRs) received from receiver 104. In some embodiments, output from at least one machine learning model may be used as input for training other machine learning models that are part of malware feature selection system 102.

Receiver 104 may include an interface (e.g., a software or hardware interface) to malware feature selection system 102 to allow malware feature selection system 102 to receive malware files and/or AVSRs. For example, receiver 104 may include a processor to receive malware files and/or AVSRs. In some embodiments, receiver 104 may include a software interface implemented in malware feature selection system 102. Receiver 104 may include one or more antivirus programs that analyze malware files to generate antivirus scan data. Receiver 104 may include a data source and/or data repository that collects malware files and/or AVSRs for transmission to and/or request by malware feature selection system 102. Receiver 104 may include other software and/or hardware components that may store and/or transmit malware files and/or AVSRs to malware feature selection system 102 for processing.

Preprocessing module 106 may include a software module (e.g., program code, software instructions) that may process at least one AVSR. In some embodiments, preprocessing module 106 may process a large dataset of AVSRs for training at least one machine learning model. For example, preprocessing module 106 may include software instructions to process labels of AVSRs to generate embeddings representing the labels of AVSRs. Preprocessing module 106 may include software instructions to, for example: (1) receive and/or identify labels of AVSRs; (2) tokenize and/or normalize the labels of the AVSRs to generate a sequence of label tokens; (3) add tokens to the sequence of label tokens to indicate the start of the sequence of label tokens, to indicate the end of the sequence of label tokens, and tokens for padding the sequence of label tokens; (4) separate the label tokens into individual characters to generate subsequences of character tokens; (5) add tokens to the subsequences of character tokens to indicate the start of a subsequence (e.g., a word), to indicate the end of a subsequence, and tokens for padding the subsequence of character tokens; (6) generate a numeric representation for each character token in the sequence, including the added tokens for indicating the start/end of subsequences, and the tokens for padding; and (7) generate embeddings for each label token based on the character tokens, the start/end tokens, and the tokens for padding. Preprocessing module 106 may be executed by a processor and may communicate with receiver 104, pre-training module 108, and/or tuning module 110 via the processor.

Pre-training module 108 may include software instructions to receive embeddings of AVSRs to train at least one machine learning model to generate encoded tokens (e.g., hidden states) and a pre-trained machine learning model. Pre-training module 108 may include at least one machine learning model, such as at least a transformer encoder. Pre-training module 108 may include software instructions to, for example: (1) receive the embeddings generated by preprocessing module 106; (2) input the embeddings into a transformer encoder or other machine learning model architecture to generate a pre-trained transformer encoder or other pre-trained machine learning model; (3) generate encoded tokens based on the embeddings as input; and (4) use the encoded tokens and the pre-trained transformer encoder or other pre-trained machine learning model for masked label prediction and masked token prediction. Pre-training module 108 may be executed by a processor and may communicate with receiver 104, preprocessing module 106, and/or tuning module 110 via the processor.

Tuning module 110 may include software instructions to receive embeddings of AVSRs to train (e.g., fine-tune) at least one machine learning model to generate encoded tokens (e.g., hidden states). Tuning module 110 may include at least one machine learning model, such as at least a transformer encoder. In some embodiments, tuning module 110 may include at least two machine learning models. In some embodiments, the at least one or the at least two machine learning models may include the pre-trained transformer encoder or other pre-trained machine learning model generated by pre-training module 108. Tuning module 110 may include software instructions to, for example: (1) receive a batch of the embeddings generated by preprocessing module 106, the batch including a number of pairs of AVSRs, each pair of AVSRs including an anchor AVSR and a positive AVSR; (2) input the batch of embeddings into at least two pre-trained transformer encoders or other pre-trained machine learning models, where the anchor AVSRs are input into a first pre-trained machine learning model and the positive AVSRs are input into a second pre-trained machine learning model; (3) generate encoded token pairs (e.g., an anchor encoded token and a positive encoded token) for each pair of the batch of embeddings based on the embeddings as input to the at least two pre-trained machine learning models; and (4) use at least one encoded token pair to determine and/or minimize a Multiple Negatives Ranking (MNR) loss. In some embodiments, tuning module 110 may generate a tuned machine learning model used to generate feature vectors for malware based on AVSRs as input to the tuned machine learning model. Tuning module 110 may be executed by a processor and may communicate with receiver 104, preprocessing module 106, and/or pre-training module 108 via the processor.

In some embodiments, output from at least one machine learning model of malware feature selection system 102 may be used as input to another machine learning model of malware feature selection system 102 for training, testing, and/or generating predictions (e.g., runtime). Malware feature selection system 102 may generate a feature vector for malware using malware files and/or AVSRs as input to a tuned machine learning model.

In some embodiments, a dataset of AVSRs may be used for training, testing, and/or production (e.g., runtime predictions). In some embodiments, a machine learning model (e.g., a transformer encoder, pre-trained and tuned) may receive a dataset of AVSRs to train the machine learning model. A machine learning model may receive a dataset of AVSRs for testing to evaluate the performance of the machine learning model. In some embodiments, a machine learning model may receive a dataset of AVSRs for prediction during production to provide a prediction output (e.g., runtime prediction).

An AVSR may include data generated from one or more antivirus products (e.g., an antivirus program, antivirus tool, and/or the like). In some embodiments, data for an AVSR may include results of an antivirus scan performed on a malware file. The results of the antivirus scan may be in the form of a report. In some embodiments, AVSR may refer to a report and/or results generated by a single antivirus product for a malware file. In some embodiments, AVSR may refer to a collection of reports and/or results from multiple antivirus products for a malware file. Data in an AVSR may include data associated with a malware file that is processed and/or scanned by an antivirus product. Data in the AVSRs may include labels for the malware file that was processed and/or scanned by the antivirus products.

The number and arrangement of systems, hardware, and/or modules (e.g., software instructions) shown in FIG. 1 is provided as an example. There may be additional systems, hardware, and/or modules, fewer systems, hardware, and/or modules, different systems, hardware, and/or modules, or differently arranged systems, hardware, and/or modules than those shown in FIG. 1. Furthermore, two or more systems, hardware, and/or modules shown in FIG. 1 may be implemented within a single system, hardware, and/or module. A single system, hardware, and/or module shown in FIG. 1 may be implemented as multiple, distributed systems, hardware, and/or modules. Additionally or alternatively, a set of systems, a set of hardware, and/or a set of modules (e.g., one or more systems, one or more hardware devices, one or more modules) of FIG. 1 may perform one or more functions described as being performed by another set of systems, another set of hardware, or another set of modules of FIG. 1.

Figure 2:
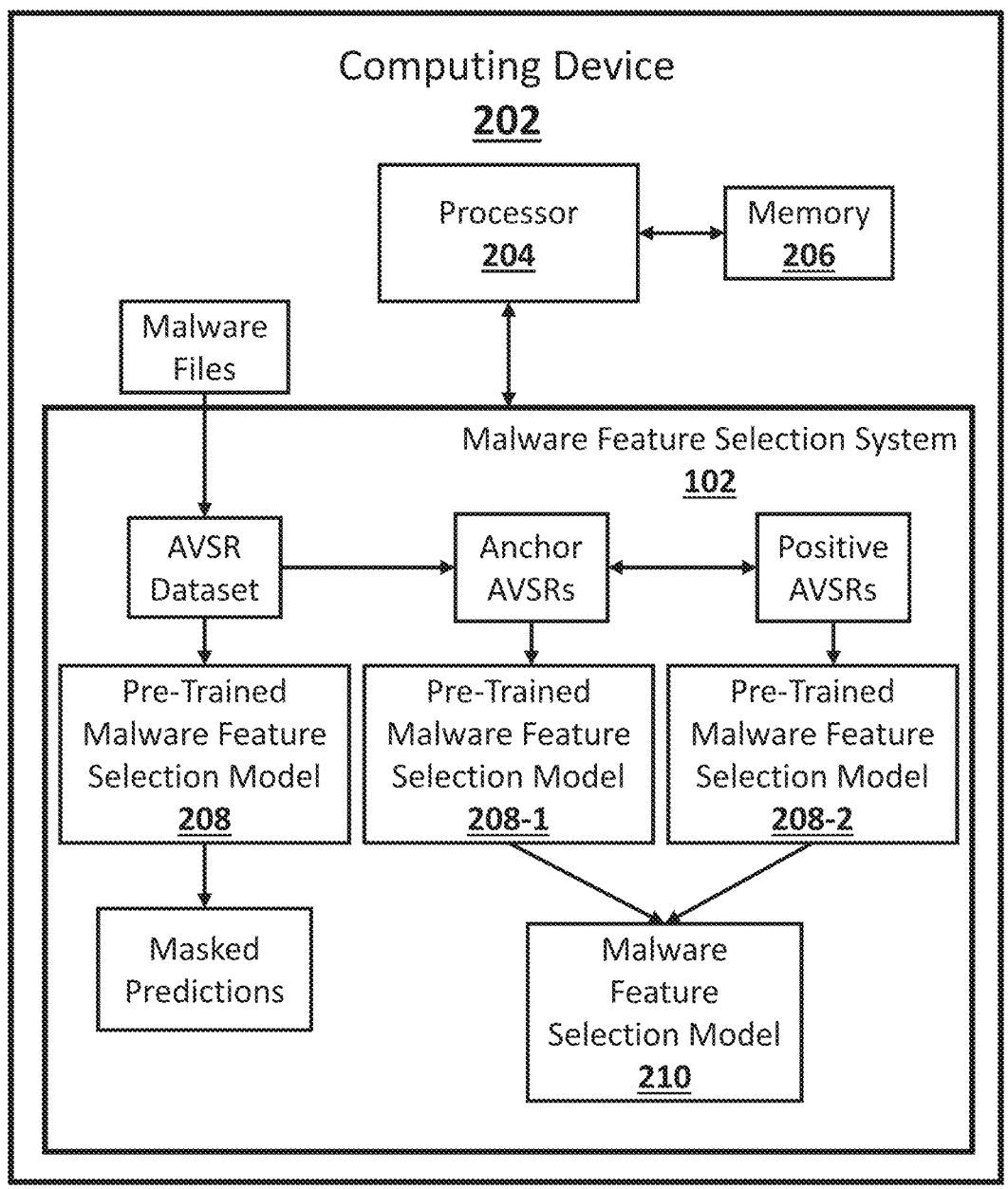
FIG. 2 is a diagram of an exemplary system configuration for generating a feature vector for malware as disclosed herein.

FIG. 2 shows a diagram of an exemplary system configuration 200 for generating a feature vector for malware as disclosed herein. The various components of FIG. 2 may be implemented in one or more computing devices (e.g., one or more servers, client devices, user devices, and/or the like) and the one or more computing devices may be connected via a communications network (e.g., the Internet). Each of the components shown in FIG. 2 are described in the context of an exemplary embodiment.

As shown in FIG. 2, embodiments relate to a system 200 configured for training machine learning models (e.g., neural models, neural networks, and/or the like) and for generating a feature vector for malware with trained machine learning models. System 200 may include computing device 202. Computing device 202 may include processor 204 (e.g., CPU) and memory 206. Processor 204 may execute software instructions (e.g., program code) for malware feature selection system 102, including software instructions for at least one pre-trained malware feature selection model 208 and/or at least one malware feature selection model 210.

Processor 204 may be implemented in hardware, software, or a combination of hardware and software. For example, processor 204 may include a common processor (e.g., a CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed and/or execute software instructions to perform a function.

Memory 206 may include random access memory (RAM), read-only memory (ROM), and/or another type of dynamic or static storage device (e.g., flash memory, magnetic memory, optical memory, etc.) that stores information and/or software instructions for use by processor 204. Memory 206 may include a computer-readable medium and/or storage component. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 from another computer-readable medium or from another device via a communication interface with computing device 102. When executed, software instructions stored in memory 206 may cause processor 204 to perform one or more processes described herein. Embodiments described herein are not limited to any specific combination of hardware circuitry and software.

Pre-trained malware feature selection model 208 may include a machine learning model (e.g., a neural model) such as a transformer encoder. Pre-trained malware feature selection model may include a trained neural network that produces embedded representations for antivirus scan data (e.g., AVSRs). Pre-trained malware feature selection model 208 may receive a dataset of AVSRs (e.g., data from malware files, antivirus scan data) as input for training, testing, and/or prediction. At least two pre-trained malware feature selection models 208 (e.g., pre-trained malware feature selection model 208-1 and 208-2) may be used with pairs of anchor AVSR embeddings and positive AVSR embeddings as input to the at least two pre-trained malware feature selection model 208 to generate a malware feature selection model 210 (e.g., via fine-tuning pre-trained malware feature selection model 208). In some embodiments, pre-trained malware feature selection model 208 may be the same as or similar to pre-trained malware feature selection model 208-1 and/or 208-2. For example, pre-trained malware feature selection model 208 may be generated using datasets of AVSRs as input, masked label prediction, and masked token prediction. Pre-trained malware feature selection model 208 may then be used as a first instance pre-trained malware feature selection model 208-1 and a second instance pre-trained malware feature selection model 208-2 to perform fine-tuning to generate malware feature selection model 210. Pre-trained malware feature selection model 208 may be executed by processor 204 via software instructions and/or data structures stored in memory 206.

Malware feature selection model 210 may include a machine learning model (e.g., a neural model). Malware feature selection model 210 may include a trained neural network that produces embedded representations for antivirus scan data (e.g., AVSRs). Malware feature selection model 210 may receive a dataset of AVSRs (e.g., data from malware files, antivirus scan data) as input for training, testing, and/or prediction. For example, malware feature selection model 210 may receive embedded representations of antivirus scan data from AVSRs (e.g., embeddings of AVSRs) for prediction and generation of a feature vector for malware. In some embodiments, malware feature selection model 210 may be the same as or similar to at least one of pre-trained malware feature selection models 208. For example, malware feature selection model 210 may be a fine-tuned version of pre-trained malware feature selection model 208-1 or 208-2. In some embodiments, malware feature selection model 210 may be a newly generated model separate from pre-trained malware feature selection models 208-1 and 208-2. Malware feature selection model 210 may be used with AVSR embeddings as input to malware feature selection model 210 to generate a feature vector for malware. In some embodiments, malware feature selection model 210 may be trained to perform other tasks, such as classification of malware, using a feature vector for malware as input to malware feature selection model 210. Malware feature selection model 210 may be executed by processor 204 via software instructions and/or data structures stored in memory 206.

The number and arrangement of systems, hardware, and/or modules (e.g., software instructions) shown in FIG. 2 is provided as an example. There may be additional systems, hardware, and/or modules, fewer systems, hardware, and/or modules, different systems, hardware, and/or modules, or differently arranged systems, hardware, and/or modules than those shown in FIG. 2. Furthermore, two or more systems, hardware, and/or modules shown in FIG. 2 may be implemented within a single system, hardware, and/or module. A single system, hardware, and/or module shown in FIG. 2 may be implemented as multiple, distributed systems, hardware, and/or modules. Additionally or alternatively, a set of systems, a set of hardware, and/or a set of modules (e.g., one or more systems, one or more hardware devices, one or more modules) of FIG. 2 may perform one or more functions described as being performed by another set of systems, another set of hardware, or another set of modules of FIG. 2.

Figure 3:
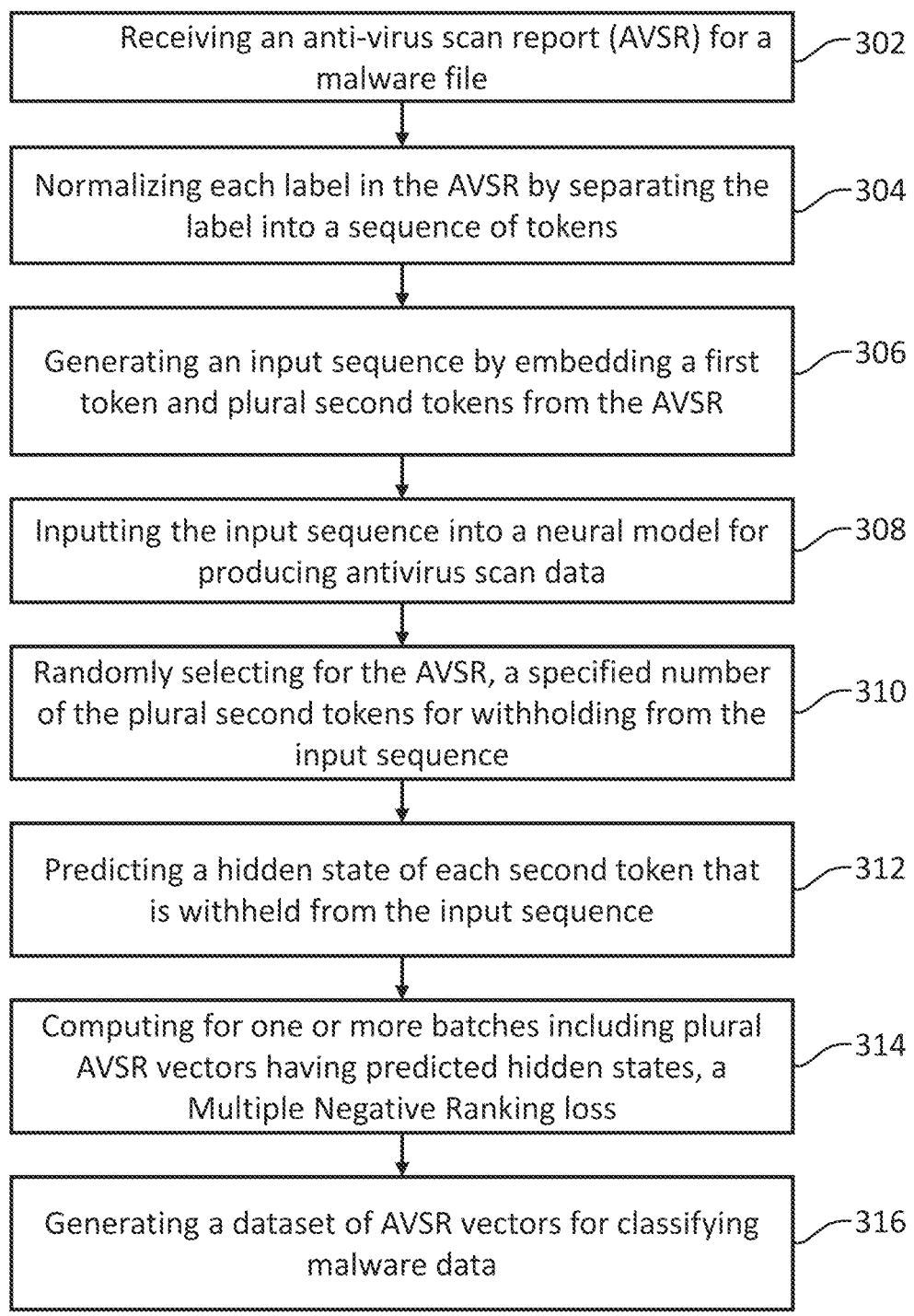
FIG. 3 is a flow diagram of an exemplary method for generating a feature vector for malware as disclosed herein.

FIG. 3 shows a flow diagram of an exemplary method 300 for generating a feature vector for malware as disclosed herein. In some embodiments, one or more of the functions described with respect to method 300 may be performed (e.g., completely, partially, etc.) by malware feature selection system 102 (e.g., via processor 204). In some embodiments, one or more of the steps of method 300 may be performed (e.g., completely, partially, etc.) by another system, hardware, or module or a group of systems, hardware, or modules separate from or including malware feature selection system 102, such as a client device and/or a separate computing device. In some embodiments, one or more of the steps of method 300 may be performed in a training phase. A training phase may include a computing environment where a machine learning model, such as a neural model, is being trained (e.g., training environment, model building phase, and/or the like). In some embodiments, one or more of the steps of method 300 may be performed in a testing phase. A testing phase may include a computing environment where a machine learning model, such as a neural model, is being tested and/or evaluated (e.g., testing environment, model evaluation, model validation, and/or the like). In some embodiments, one or more of the steps of method 300 may be performed in a runtime phase. A runtime phase may include a computing environment where a machine learning model, such as a neural model, is active (e.g., deployed, accessible as a service, etc.) and is capable of generating runtime predictions based on runtime inputs.

As shown in FIG. 3, at step 302, method 300 may include receiving an AVSR for a malware file. For example, receiver 104 and/or processor 204 may receive at least one AVSR for at least one malware file. In some embodiments, receiver 104 and/or processor 204 may receive plural AVSRs for plural malware files, where each AVSR is associated with one malware file. An AVSR may include antivirus scan data generated by one antivirus product or antivirus scan data generated by plural antivirus products for the malware file. For example, antivirus scan data generated by plural antivirus products for a malware file may be aggregated into an AVSR for the malware file.

In some embodiments, preprocessing module 106 may receive an AVSR for a malware file (e.g., via a processor). The AVSR may have at least one label including a sequence of tokens that identify an antivirus product and attributes of the malware file. An example of a label of an AVSR may include the following: Trojan.Win32.WannaCry.5267459. The sequence of tokens is: token1=Trojan, token2=Win32, token3=WannaCry, token4=5267459. The tokens in the sequence may identify an antivirus product that performed a scan of a malware file and generated antivirus scan data for the AVSR and the tokens may identify attributes of the malware file that was scanned.

A token may include a basic unit of text and/or code. For example, a token may include a sequence of characters (e.g., alphanumeric characters). For example, a token may include a sequence of characters, such as a string. A token may be a sequence of characters within a label of an AVSR. A token may be a portion of a label representing an attribute of a malware file, an attribute of an antivirus product, or another attribute. In some embodiments, a token can be a word in a label of an AVSR. An example of a token may include "win32", "wannacry", and/or "527378." In some embodiments, a token may include a single character (e.g., a character token, and/or the like).

At step 304, method 300 may include normalizing each label in the AVSR by separating each label into a sequence of tokens. For example, preprocessing module 106 and/or processor 204 may normalize each label in the AVSR by separating the label into a sequence of tokens. Preprocessing module 106 and/or processor 204 may separate the label into a sequence of tokens including a set of token strings. Preprocessing module 106 and/or processor 204 may normalize each label in the AVSR by modifying each token string of the sequence of tokens such that all alphabetic characters in each token string are lower case (e.g., token1=trojan, token2=win32, token3=wannacry).

In some embodiments, preprocessing module 106 and/or processor 204 may normalize each label in the AVSR by inserting bracket tokens and pad tokens into at least one normalized label based on at least an identified antivirus product. Preprocessing module 106 and/or processor 204 may separate each token string in the at least one normalized label into individual characters. Preprocessing module 106 and/or processor 204 may bracket the individual characters of each token string in the at least one normalized label with second tokens. Preprocessing module 106 and/or processor 204 may map each bracketed token string, the first token, and pad token in the at least one normalized label to a numeric representation.

At step 306, method 300 may include generating an input sequence by embedding a first token and plural second tokens from the AVSR. For example, preprocessing module 106 and/or processor 204 may generate an input sequence for the malware file based on embedding a first token and plural second tokens from the AVSR. Preprocessing module 106 and/or processor 204 may embed a first token and plural second tokens to generate an input sequence including plural embeddings for the malware file. The first token may identify a start of the input sequence (e.g., an embedding for <SOS_ViRobot>) and each second token of the plural second tokens may correspond to the AVSR for malware files. A second token may correspond to antivirus scan data generated by an antivirus product that analyzed and/or scanned the malware file. The plural second tokens may include embeddings for the labels of the AVSR (e.g., trojan, win32, wannacry, etc.). For example, each second token of the plural second tokens may correspond to a token in the sequence of tokens for the label. In some embodiments, each label may include L token embeddings and the label may be arranged at a fixed location within the input sequence, where L is a maximum length of each label in the input sequence.

At step 308, method 300 may include inputting the input sequence into a neural model for producing antivirus scan data. For example, pre-training module 108 and/or processor 204 may input the input sequence into a neural model (e.g., pre-trained malware feature selection model 208) for producing encoded embeddings representing data (e.g., labels) from an AVSR. In some embodiments, the neural model may include a transformer encoder. In some embodiments, the encoded embeddings produced by the neural model may include embedded tokens that have been encoded (e.g., encoded tokens, hidden states).

Antivirus scan data may include data from one or more antivirus scans of a malware file in various forms. For example, antivirus scan data may include data generated by an antivirus product (e.g., an AVSR) based on analyzing and/or scanning a malware file. Antivirus scan data may include embedded representations of data generated by an antivirus product based on analyzing and/or scanning a malware file. For example, outputs of a neural model (e.g., encoded tokens, embeddings, hidden states, and/or the like) and inputs to the neural model, including AVSRs, may be generally referred to as antivirus scan data.

In some embodiments, inputting the input sequence into a neural model may include performing masked label prediction. Performing masked label prediction may allow the neural model to learn semantic meanings for each label in the AVSR. During masked label prediction, one antivirus product (e.g., an antivirus program) that scanned the malware file is selected at random out of plural antivirus products that scanned the malware file. Tokens of AVSRs generated by the one antivirus product are replaced with alternate tokens, such as <ABS> tokens. The one antivirus product that is selected may have previously detected a malware file as benign. A long short-term memory (LSTM) decoder model may be trained to autoregressively predict the tokens of AVSRs generated by the antivirus product that have been replaced with the alternate tokens. The LSTM decoder has a hidden size of D (768 by default) and n_layers=4 recurrent layers. Initial input to the LSTM decoder may include the embedding of the token identifying the start of an input sequence (e.g., the <SOS> embedding, <SOS_ViRobot> embedding, and/or the like) for the antivirus product whose label may be predicted.

A final encoded embedding (e.g., hidden state) may be used as input to a feedforward neural network (FFNN) with an input size of D and an output size of D·n_layers. The output of the FFNN may be reshaped and used as the initial hidden state of the LSTM before a first timestep. An initial cell state of the LSTM may be set to zero before the first timestep. At each decoding timestep t, the outputs of the LSTM may be passed to another FFNN followed by an adaptive softmax approximation, resulting in log probabilities for a large amount (e.g., 10 million) of most common tokens of AVSRs. Resulting hidden states and cell states (e.g., ht and ct) may also update at each decoding timestep, and the resulting hidden states and cell states may be used as the initial hidden states and cell states of timestep t+1. Iteration may be performed until the neural network produces an <EOS> token or until L timesteps pass.

The LSTM decoder may use 50% teacher forcing to assist with training. In 50% of cases where teacher forcing is not used, a token with a highest log probability may be used as input to the LSTM decoder during timestep t+1. In this way, the neural model may achieve high performance by always selecting the token with the highest likelihood, thus reducing and/or eliminating any requirement to use a beam search algorithm.

At step 310, method 300 may include randomly selecting for the AVSR, a specified number of the plural second tokens for withholding from the input sequence. For example, pre-training module 108 and/or processor 204 may randomly select, for each AVSR vector (e.g., each subsequence within the input sequence) in the input sequence, a specified number of the plural second tokens in the input sequence for withholding from input to a neural model used for prediction. Pre-training module 108 and/or processor 204 may randomly select a specified number of the plural second tokens in the input sequence for withholding to use for performing masked token prediction. For example, pre-training module 108 and/or processor 204 may randomly select 5% of the plural second tokens for the AVSR and the 5% of the plural second tokens selected may be withheld from the input sequence used for prediction.

In some embodiments, randomly selecting a specified number of the plural second tokens for withholding from the input sequence may include replacing any unselected plural second tokens that are identical to the randomly selected tokens with a mask token.

In some embodiments, inputting the input sequence into a neural model may include performing masked token prediction. Performing masked token prediction may allow the neural model to learn semantic meanings of tokens by making inferences based on content of the AVSRs. During masked token prediction, a number of tokens (e.g., 5% of tokens in the input sequence) may be selected at random and withheld from using as input to the neural model for generating predictions.

At step 312, method 300 may include predicting a hidden state of each second token that is withheld from the input sequence. For example, pre-training module 108 and/or processor 204 may predict, for each AVSR vector in the input sequence, a hidden state of each second token that is withheld from the input sequence (e.g., each second token that was not randomly selected in the input sequence).

The neural model may use remaining tokens (e.g., tokens that were not randomly selected) from a current AVSR label and a remainder of the input sequence as context for making predictions. In some embodiments, the randomly selected tokens may have a chance (e.g., an 80% chance) of being replaced with an alternate token (e.g., a <MASK> token), a chance (e.g., a 10% chance) of being replaced with a random token, and a chance (e.g., a 10% chance of) no modification. In order to prevent the neural model from "cheating" when learning semantic meanings of tokens, any other tokens in the input sequence which may be identical to the randomly selected tokens may also be replaced with an alternate token (e.g., a <MASK> token). In this way, the neural model is encouraged to learn context from tokens that may have related meanings, such as family aliases.

In some embodiments, if an ith token in the input sequence is selected, then a final hidden state Ti may be used as input to a FFNN, followed by adaptive softmax approximation to obtain log probabilities for a large amount (e.g., 10 million) of most common tokens of AVSRs.

In some embodiments, when an $i^{th}$ token in the input sequence is selected, pre-training module 108 and/or processor 204 may input a final hidden state $T_i$ to a first feed-forward neural network. Pre-training module 108 and/or processor 204 may compute log probabilities on an output of the feed-forward neural network using an adaptive softmax approximation. In some embodiments, pre-training module 108 and/or processor 204 may predict withheld tokens in each label of the input sequence using plural second tokens in a current label and the input sequence that were not randomly selected for withholding. Pre-training module 108 and/or processor 204 may input to the LSTM decoder a token identifying the malware product that produced a withheld token to be processed.

In some embodiments, pre-training module 108 and/or processor 204 may iteratively predict the withheld tokens and input the token identifying the malware product. Iteration may continue for L timesteps or until an end token is generated, where L is a maximum length of each label. For iteration, at each time step, pre-training module and/or processor 204 may pass one or more outputs of the LSTM decoder to a second feed-forward neural network. At each time step, pre-training module 108 and/or processor 204 may compute log probabilities on an output of the second feed-forward neural network using the adaptive softmax approximation.

At step 314, model 300 may include computing, for one or more batches including plural AVSR vectors having predicted hidden states, a MNR loss. For example, tuning module 110 and/or processor 204 (e.g., via pre-trained malware feature selection models 208-1 and 208-2) may compute a MNR loss for a batch of embeddings (e.g., embeddings in the plural AVSR vectors). The batch of embeddings may include a number of pairs of AVSRs, each pair of AVSRs including an anchor AVSR and a positive AVSR from the AVSR vectors. In some embodiments, the MNR loss may be computed by using at least two pre-trained transformer encoders (e.g., pre-trained malware feature selection model 208-1 and 208-2) or other pre-trained machine learning models. The anchor AVSRs may be input into a first pre-trained machine learning model and the positive AVSRs may be input into a second pre-trained machine learning model. The at least two pre-trained machine learning models may generate encoded token pairs (e.g., an anchor encoded token and a positive encoded token) for each pair of the batch of embeddings based on the embeddings as input to the at least two pre-trained machine learning models.

In some embodiments, tuning module 110 and/or processor 204 may compute, for one or more batches including plural AVSR vectors having predicted hidden states, a Multiple Negative Ranking loss. Each batch may include k pairs of AVSR vectors. In some embodiments, a first AVSR vector in each pair may be randomly sampled from the dataset. A second AVSR vector in each pair may have a same malware classification as the first AVSR vector. In some embodiments, training module 110 and/or processor 204 may input the first AVSR vector and the second AVSR vector of each pair, separately, into two neural models for embedding tokens from AVSRs. The two pre-trained models may have shared (e.g., identical) weights.

Tuning module 110 and/or processor 204 may use at least one encoded token pair to compute and/or minimize the MNR loss. For example, processor 204 may minimize the MNR loss based on the encoded anchor tokens and the encoded positive tokens (e.g., final hidden states) obtained from the at least two pre-trained machine learning models. For each encoded anchor token, there exists an encoded positive token that is paired with the anchor token. Every other encoded positive token that is not paired with a corresponding encoded anchor token is treated as a negative candidate (e.g., unrelated to the corresponding encoded anchor token). That is, each encoded anchor token has only one positive candidate associate with the encoded anchor token, and that is the encoded positive token that the anchor token is paired with in the batch of embedded tokens.

A neural model may learn to reduce the distance between each encoded anchor-positive pair, while increasing the distance between each encoded anchor token and its negative candidates. A score function may be defined as $S(C_{anc_i}, C_{pos_j})$ as a dot product of $C_{anc_i}$ and $C_{pos_j}$, and model parameters may be defined as θ. Formally, the MNR loss for a batch is given by:

$$\mathcal{J}_\theta(C_{anc}, C_{pos}) = -\frac{1}{k} \sum_{i=1}^{k} \left[ S(C_{anc_i}, C_{pos_i}) - \log \sum_{j=1}^{k} e^{S(C_{anc_i}, C_{pos_j})} \right]$$

where $\mathcal{J}_\theta(C_{anc}, C_{pos})$ is the MNR loss, $(C_{anc}, C_{pos})$ is an encoded anchor token and encoded positive token pair, and k is a number of pairs in the batch of embedded tokens.

In this way, MNR loss may be used for machine learning tasks related to malware due to a limited supply of labeled data in the malware space. MNR may allow for determining if two malware samples in a pair are related (e.g., an anchor-positive pair) or unrelated, where determining if the malware samples in a pair are unrelated (e.g., an anchor-negative pair) is much more difficult than determining if the malware samples in a pair are related. Determining if two malware samples in a pair are related may be achieved using robust file similarity metrics, while determining if two malware samples in a pair are unrelated may require family labels. Determining MNR loss does not require negative candidates to be explicitly provided. Due to the vast number of malware families in existence, negative candidates in a batch may be unlikely to belong to the same family as an anchor candidate. In some embodiments, the MNR loss may be used to evaluate the performance of a machine learning model. For example, the MNR loss may be used to evaluate the performance of pre-trained malware feature selection model 208-1 or 208-2 and the performance of malware feature selection model 210. When the MNR loss and/or performance of a machine learning model is acceptable, the machine learning model may be used to make runtime predictions and may be used to generate feature vectors for malware that can be used for classifying malware data.

As shown in step 316, model 300 may generate a dataset of AVSR vectors (e.g., feature vectors) for classifying malware data using a trained and/or tuned machine learning model. For example, tuning module 110 and/or processor 204 (e.g., via malware feature selection model 210) may generate a dataset of AVSR vectors (e.g., features vectors) for classifying malware data. Tuning module 110 and/or processor 204 may output antivirus scan data produced by the neural model as one or more feature vectors for malware.

Tuning module 110 and/or malware feature selection system 210 may receive embedded tokens (e.g., an input sequence) as input to generate a prediction including at least one feature vector for malware. The at least one feature vector for malware may be used as input to another machine learning model for performing another task, such as classification (e.g., classifying malware). In some embodiments, the at least one feature vector may be used as input to another machine learning model to train, retrain, fine-tune, and/or further train the machine learning model.

In some embodiments, a neural model may be trained using disclosed embodiments. For example, processor 204 may train a neural model using preprocessing module 106, pre-training module 108, and/or tuning module 110 by randomly selecting, for each AVSR vector in the input sequence, a specified number of the plural second tokens in the input sequence for withholding. Pre-training module 108 may predict for each AVSR vector in the input sequence, a hidden state of each second token that was not randomly selected in the input sequence. Tuning module 110 may compute, for one or more batches including plural AVSR vectors having predicted hidden states, a Multiple Negative Ranking Loss. A trained model, such as malware feature selection model 210, may generate a dataset of AVSR vectors for classifying malware data.

Figure 4:
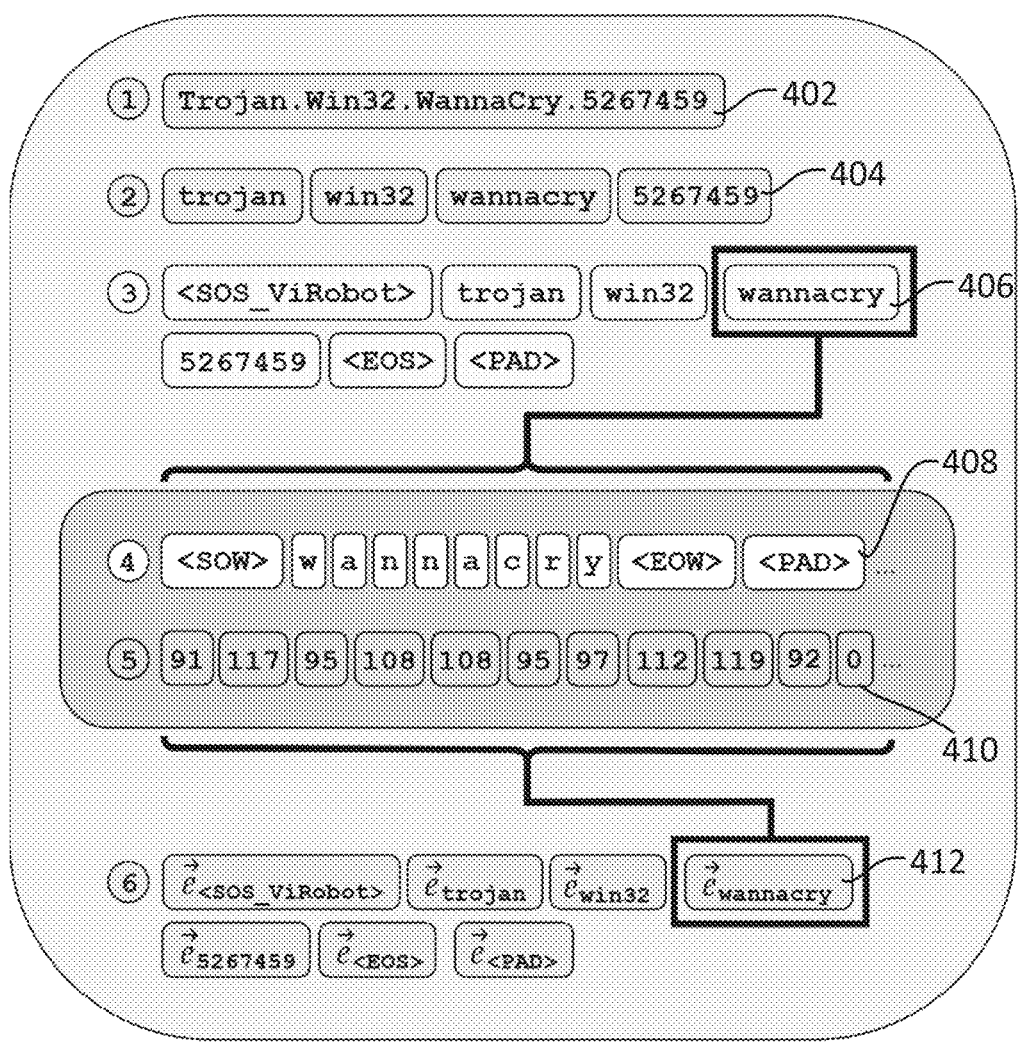
FIG. 4 is a diagram of an exemplary preprocessing module for preprocessing a label of a malware file as disclosed herein.

FIG. 4 shows a diagram of an exemplary preprocessing module 400 for preprocessing a label of a malware file as disclosed herein. Preprocessing module 106 may be the same as or similar to exemplary preprocessing module 400 and preprocessing module 106 may perform the same and/or similar functions as exemplary preprocessing module 400.

Preprocessing module 400 may include a software module (e.g., program code, software instructions) that may process at least one AVSR. In some embodiments, preprocessing module 400 may process a large dataset of AVSRs for training at least one machine learning model. For example, preprocessing module 400 may include software instructions to process AVSR labels 402 to generate AVSR embeddings 412 representing the labels of AVSRs.

Preprocessing module 400 may include software instructions to receive and/or identify AVSR labels 402. For example, preprocessing module 400 may receive AVSR labels 402 from an antivirus product as a string of characters. Preprocessing module may tokenize and/or normalize the AVSR labels to generate a sequence of label tokens 404. For example, preprocessing module 400 may tokenize the AVSR labels 402 by removing a label delimiter (e.g., ".") and by separating characters between the label delimiters into separate tokens. Preprocessing module 400 may normalize each label token in the sequence of label tokens 404 from AVSR label 402 by making the characters in the tokens and/or labels consistent (e.g., all lower-case alphabetic characters). Preprocessing module 400 may add tokens to the sequence of label tokens 404 to indicate the start of the sequence of label tokens, to indicate the end of the sequence of label tokens, and tokens for padding the sequence of label tokens to generate an augmented sequence of tokens 406. Added tokens may include, for example, sequence labels such as <SOS_ViRobot> (e.g., identifying the start of the sequence of tokens 404 and identifying attributes of the antivirus product that generated the corresponding AVSR and label 402), <EOS> (e.g., identifying the end of the sequence of tokens 404), and <PAD> for padding the sequence of tokens 404 to separate the sequence of tokens 404 from another sequence of tokens. Preprocessing module 400 may separate each token of the augmented sequence of tokens 406 into individual characters to generate at least one subsequence of character tokens 408. A subsequence of character tokens 408 may include a token indicating the start of a subsequence (e.g., a <SOW> token), a token indicating the end of a subsequence (e.g., a <EOW> token) and tokens for padding the subsequence of character tokens (e.g., <PAD>). Preprocessing module 400 may add tokens to the subsequences of character tokens to indicate the start of a subsequence (e.g., a word and/or string between delimiters in AVSR label 402), to indicate the end of a subsequence, and tokens for padding the subsequence of character tokens 408. In some embodiments, one or more subsequences of character tokens 408 may make up a sequence of tokens 404 and/or an augmented sequence of tokens 406.

Preprocessing module 400 may determine a numeric representation for each character token in the sequence of character tokens 408 to generate a sequence of numeric representations 410. The sequence of numeric representations 410 may include tokens added by preprocessing module 400 for indicating the start/end of subsequences, and the tokens for padding. In sequences of numeric representations 410, each token in the sequence of character tokens 408 may be assigned a numeric representation based on one or more rules and/or encoding algorithm. Preprocessing module 400 may determine embeddings for each token in the sequence of label tokens 404 based on the sequence of numeric representations 410 to generate a sequence of AVSR embeddings 412. The sequence of AVSR embeddings 412 may be used as input to a machine learning model for training the machine learning model to learn representations and context of malware and/or malware files. Preprocessing module 400 may be executed by a processor (e.g., processor 204) and may communicate with other systems, devices, and/or software modules via the processor and/or a communications interface.

Figure 5:
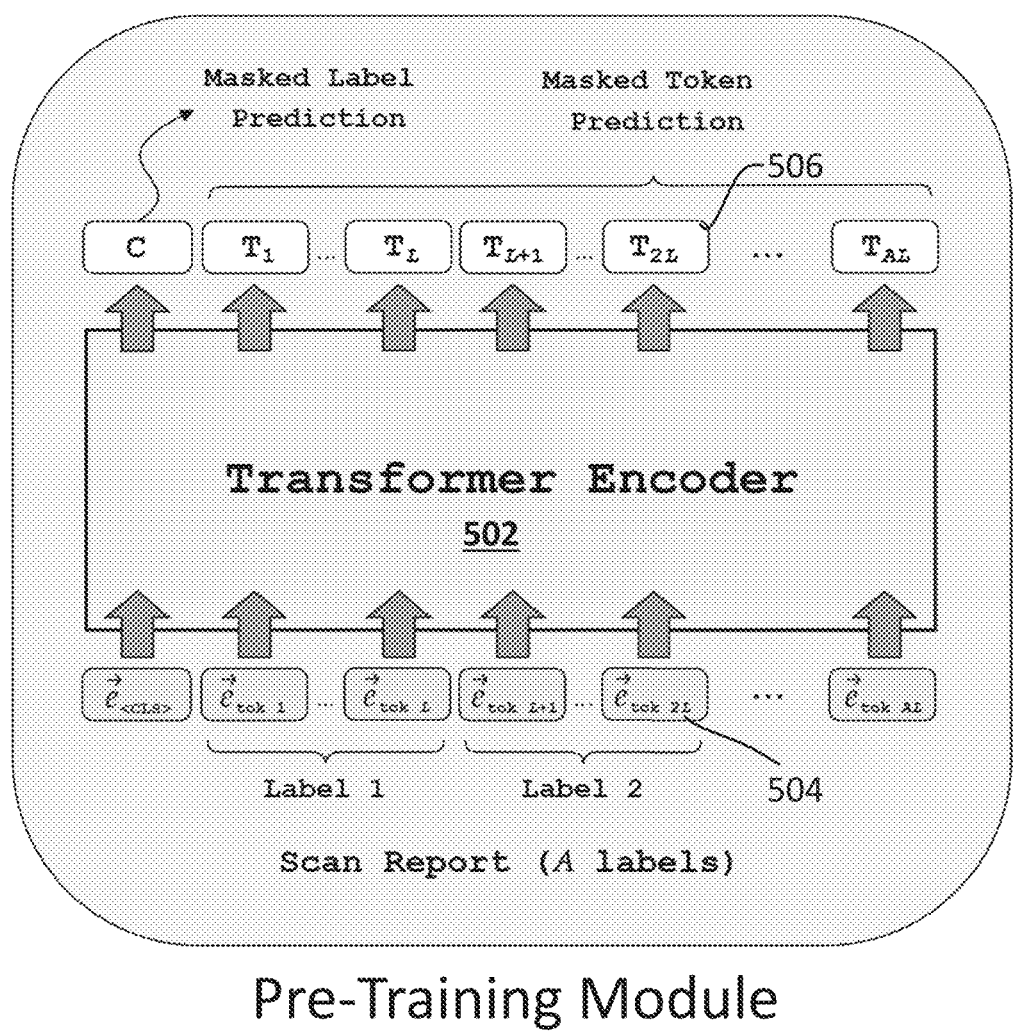
FIG. 5 is a diagram of an exemplary pre-training module for encoding at least one token as disclosed herein.

FIG. 5 shows a diagram of an exemplary pre-training module 500 for encoding at least one token as disclosed herein. Pre-training module 108 may be the same as or similar to exemplary pre-training module 500 and pre-training module 108 may perform the same and/or similar functions as exemplary pre-training module 500.

Pre-training module 500 may include software instructions to receive embeddings of AVSRs (e.g., sequence of AVSR embeddings 412) to train at least one machine learning model to generate encoded tokens (e.g., hidden states) and may include a pre-trained and/or untrained machine learning model. For example, pre-training module 500 may receive at least one embedding 504 (e.g., embedded AVSR labels) for training a machine learning model. Pre-training module 500 may include at least one machine learning model, such as at least a transformer encoder 502.

Pre-training module 500 may include software instructions to receive at least one embedding 504 generated by a preprocessing module. Pre-training module 500 may input the at least one embedding 504 into transformer encoder 502 to generate a pre-trained transformer encoder 502. Transformer encoder 502 may have been pre-trained prior to pre-training module 500 inputting the at least one embedding 504 into transformer encoder 502, or transformer encoder 502 may be untrained (e.g., has not yet been trained with data inputs) prior to pre-training module 500 inputting the at least one embedding 504 into transformer encoder 502. Pre-training module 500 may generate at least one encoded token 506 based on processing the at least one embedding 504 as input to transformer encoder 502. Pre-training module 500 may use the at least one encoded token 506 (e.g., a sequence of encoded tokens 506) and the pre-trained transformer encoder 502 for masked label prediction and/or masked token prediction as disclosed herein.

The encoded tokens 506 may be used as input to a machine learning model for training the machine learning model to learn representations and context of malware and/or malware files and/or other machine learning tasks for malware files. Pre-training module 500 may be executed by a processor (e.g., processor 204) and may communicate with other systems, devices, and/or software modules via the processor and/or a communications interface.

Figure 6:
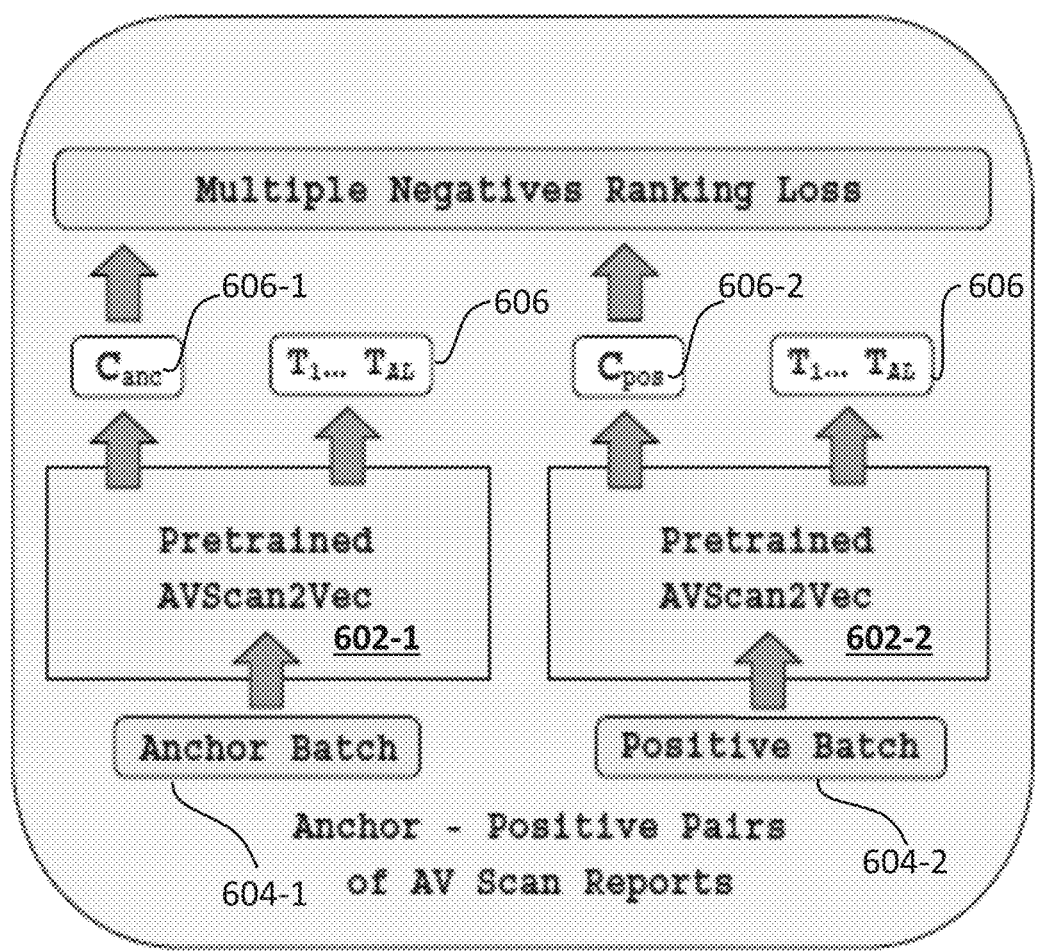
FIG. 6 is a diagram of an exemplary tuning module for training a machine learning model to learn to generate feature vectors for malware as disclosed herein.

FIG. 6 shows a diagram of an exemplary tuning module 600 for training a machine learning model to learn to generate feature vectors for malware as disclosed herein. Tuning module 110 may be the same as or similar to exemplary tuning module 600 and tuning module 110 may perform the same and/or similar functions as exemplary tuning module 600. In some embodiments, pre-trained malware feature selection model 208-1 and 208-2 may be the same as or similar to exemplary tuning module 600.

Tuning module 600 may include software instructions to receive at least one batch of embeddings 604 of AVSRs to train (e.g., fine-tune) at least one machine learning model to generate encoded tokens 606 (e.g., hidden states). Tuning module 600 may include at least one machine learning model, such as at least a transformer encoder 602. In some embodiments, tuning module 600 may include at least two machine learning models. In some embodiments, the at least one or the at least two machine learning models may include a pre-trained transformer encoder (e.g., transformer encoder 502).

Tuning module 600 may include software instructions to receive a batch of embeddings 604 generated by a preprocessing module, the batch of embeddings 604 including a number of pairs of AVSRs, each pair of AVSRs including an anchor AVSR and a positive AVSR. The batch of embeddings 604 may include a batch of anchor embeddings 604-1 and a batch of positive embeddings 604-2 making up the number of pairs of AVSRs (e.g., embeddings of AVSRs labels). Tuning module 600 may input the batch of embeddings 604 into at least two pre-trained transformer encoders 602-1 and 602-2. The batch of anchor embeddings may be input into pre-trained machine learning model 602-1 and the positive embeddings may be input into pre-trained machine learning model 602-2. Tuning module 600 may generate encoded token pairs 606 (e.g., an anchor encoded token and a positive encoded token) for each pair of the batch of embeddings 604 based on the batch of embeddings 604 as input to the at least two pre-trained machine learning models 602.

Tuning module 600 may use at least one encoded token pair 606 to determine and/or minimize a MNR loss. For example, tuning module 600 may use an encoded token pair that corresponds to the antivirus whose label is to be predicted, or the encoded token pair that corresponds to the antivirus product attributes of an AVSR. Tuning module 600 may use encoded token 606-1 and encoded token 606-2 (e.g., an encoded token pair) to determine the MNR loss. In some embodiments, tuning module 600 may generate a tuned machine learning model used to generate feature vectors for malware based on AVSRs as input to the tuned machine learning model. For example, tuning module 600 may generate a tuned machine learning model similar to malware feature selection model 210. Alternatively, tuning module 600 may generate a tuned machine learning model based on pre-trained malware feature selection model 208-1 or 208-2 (e.g., the tuned machine learning model is a retrained and/or fine-tuned version of either pre-trained malware feature selection model 208-1 or 208-2). In some embodiments, a feature vector for malware generated by tuning module 600 may be used as input to another machine learning model to train, retrain, fine-tune, and/or further train the machine learning model. Tuning module 600 may be executed by a processor (e.g., processor 204) and may communicate with other systems, devices, and/or software modules via the processor and/or a communications interface.

In some embodiments, output from tuning module may be used as input to another machine learning model for training, testing, and/or generating predictions (e.g., runtime). Tuning module 600 may generate a feature vector for malware using malware files and/or AVSRs as input to a tuned machine learning model.

In some embodiments, a dataset of AVSRs may be used for training, testing, and/or production (e.g., runtime). In some embodiments, a machine learning model (e.g., a transformer encoder, pre-trained and tuned) may receive a dataset of AVSRs to train the machine learning model. A machine learning model may receive a dataset of AVSRs for testing to evaluate the performance of the machine learning model. In some embodiments, a machine learning model may receive a dataset of AVSRs for prediction during production to provide a prediction output (e.g., runtime prediction).

Any of the processors disclosed herein can include any integrated circuit or other electronic device (or collection of devices) capable of performing an operation on at least one instruction, which can include a Reduced Instruction Set Core (RISC) processor, a CISC microprocessor, a Microcontroller Unit (MCU), a CISC-based Central Processing Unit (CPU), a Digital Signal Processor (DSP), a Graphics Processing Unit (GPU), a Field Programmable Gate Array (FPGA), etc. The hardware of such devices may be integrated onto a single substrate (e.g., silicon "die"), or distributed among two or more substrates. Various functional aspects of the processor may be implemented solely as software or firmware associated with the processor.

The processor can include one or more processing or operating modules. A processing or operating module can be a software or firmware operating module configured to implement any of the functions disclosed herein. The processing or operating module can be embodied as software and stored in memory, the memory being operatively associated with the processor. A processing module can be embodied as a web application, a desktop application, a console application, etc.

The processor can include or be associated with a computer or machine readable medium. The computer or machine readable medium can include memory. Any of the memory discussed herein can be computer readable memory configured to store data. The memory can include a volatile or non-volatile, transitory or non-transitory memory, and be embodied as an in-memory, an active memory, a cloud memory, etc. Examples of memory can include flash memory, Random Access Memory (RAM), Read Only Memory (ROM), Programmable Read only Memory (PROM), Erasable Programmable Read only Memory (EPROM), Electronically Erasable Programmable Read only Memory (EEPROM), FLASH-EPROM, Compact Disc (CD)-ROM, Digital Optical Disc DVD), optical storage, optical medium, a carrier wave, magnetic cassettes, magnetic tape, magnetic disk storage or other magnetic storage devices, or any other medium which can be used to store the desired information and which can accessed by the processor.

The memory can be a non-transitory computer-readable medium. The term "computer-readable medium" (or "machine-readable medium") as used herein is an extensible term that refers to any medium or any memory, that participates in providing instructions to the processor for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, transmission media, etc. The computer or machine readable medium can be configured to store one or more instructions thereon. The instructions can be in the form of algorithms, program logic, etc. that cause the processor to execute any of the functions disclosed herein.

Embodiments of the memory can include a processor module and other circuitry to allow for the transfer of data to and from the memory, which can include to and from other components of a communication system. This transfer can be via hardwire or wireless transmission. The communication system can include transceivers, which can be used in combination with switches, receivers, transmitters, routers, gateways, wave-guides, etc. to facilitate communications via a communication approach or protocol for controlled and coordinated signal transmission and processing to any other component or combination of components of the communication system. The transmission can be via a communication link. The communication link can be electronic-based, optical-based, opto-electronic-based, quantum-based, etc. Communications can be via Bluetooth, near field communications, cellular communications, telemetry communications, Internet communications, etc.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can also be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc. Transmission of data and signals can be via transmission media. Transmission media can include coaxial cables, copper wire, fiber optics, etc. Transmission media can also take the form of acoustic or light waves, such as those generated during radio-wave and infrared data communications, or other form of propagated signals (e.g., carrier waves, digital signals, etc.).

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable computing device to implement the present methods as discussed herein. In particular, the computer programs stored on a non-transitory computer-readable medium, when executed, can enable hardware processor device to implement the methods as discussed herein. Accordingly, such computer programs can represent controllers of the computing device.

Figure 7:
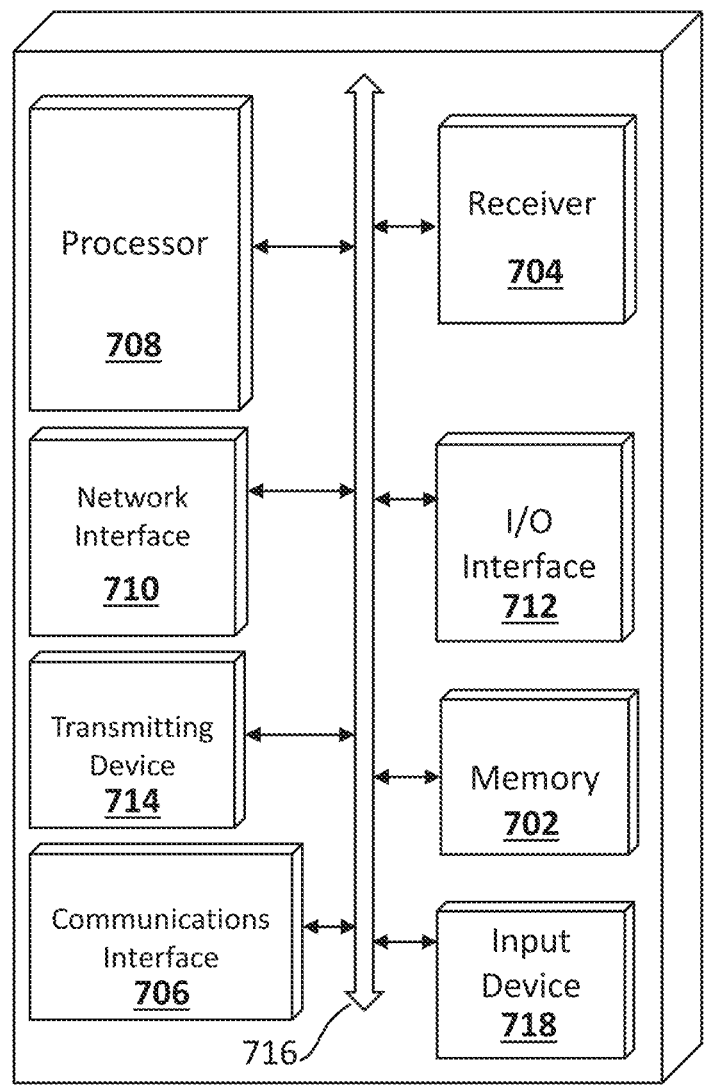
FIG. 7 is a diagram of example components of a computing device or system as disclosed herein.

FIG. 7 shows a diagram of example components of a computing device or system 700 as disclosed herein. Computing device 700 (and/or at least one component of computing device 700) may correspond to at least one of malware feature selection system 102, receiver 104, computing device 202, processor 204, and/or memory 206 in FIGS. 1 and 2. In some embodiments, such systems or devices in FIGS. 1-6 may include at least one computing device 700 and/or at least one component of computing device 700. The number and arrangement of components shown in FIG. 7 are provided as an example. In some embodiments, computing device 700 may include additional components, fewer components, different components, or differently arranged components than those shown in FIG. 7. Additionally, or alternatively, a set of components (e.g., one or more components) of computing device 700 may perform one or more functions described as being performed by another set of components of computing device 700.

The computing system or device 700 may include memory 702, a receiver or receiving device 704, a communications interface 706, a processor 708, a network interface 710, an input/output (I/O) interface 712, a transmitting device 714, a communication infrastructure 716, and an input device 718. Memory 702 may be the same as or similar to memory 206 as disclosed herein. Receiver 704 may be the same as or similar to receiver 104 as disclosed herein. Processor 708 may be the same as or similar to processor 204 as disclosed herein.

The memory 702 can be configured for storing program code for at least one machine learning model. The memory 702 can include one or more memory devices such as volatile or non-volatile memory. For example, the volatile memory can include random access memory. According to exemplary embodiments, the non-volatile memory can include one or more resident hardware components such as a hard disk drive and a removable storage drive (e.g., a floppy disk drive, a magnetic tape drive, an optical disk drive, a flash memory, or any other suitable device). The non-volatile memory can include an external memory device connected to communicate with the system 700 via a mobile communication network. According to an exemplary embodiment, an external memory device can be used in place of any resident memory devices. Data stored in system 700 may be stored on any type of suitable computer readable media, such as optical storage (e.g., a compact disc, digital versatile disc, Blu-ray disc, etc.) or magnetic tape storage (e.g., a hard disk drive). The stored data can include network traffic data, log data, streaming events, and/or CDRs generated and/or accessed by the processor 708, and software or program code used by the processor 708 for performing the tasks associated with the exemplary embodiments described herein. The data may be configured in any type of suitable database configuration, such as a relational database, a structured query language (SQL) database, a distributed database, an object database, etc. Suitable configurations and storage types will be apparent to persons having skill in the relevant art.

The receiving device 704 may be a combination of hardware and software components configured to receive data samples from the mobile network or database. According to exemplary embodiments, the receiving device 704 can include a hardware component such as an antenna, a network interface (e.g., an Ethernet card), a communications port, a Personal Computer Memory Card International Association (PCMCIA) slot and card, 5G New Radio (NR) interface, or any other component or device suitable for use on a mobile communication network or Radio Access Network as desired. The receiving device 704 can be an input device for receiving signals and/or data samples formatted according to 3GPP protocols and/or standards. The receiving device 704 can be connected to other devices via a wired or wireless network or via a wired or wireless direct link or peer-to-peer connection without an intermediate device or access point. The hardware and software components of the receiving device 704 can be configured to receive the data from the mobile network according to one or more communication protocols and data formats. For example, the receiving device 704 can be configured to communicate over a network, which may include a local area network (LAN), a wide area network (WAN), a wireless network (e.g., Wi-Fi), a mobile communication network, a satellite network, the Internet, fiber optic cable, coaxial cable, infrared, radio frequency (RF), another suitable communication medium as desired, or any combination thereof. During a receive operation, the receiving device 704 can be configured to identify parts of the received data via a header and parse the data signal and/or data packet into small frames (e.g., bytes, words) or segments for further processing at the processor 708.

The processor 708 can be configured for executing the program code stored in memory 702. Upon execution, the program code causes the processor 708 to perform the functions at a node on the mobile communication network or remote computing device (e.g., server, computer, etc.) of the user and executes program code to generate a feature vector for malware on the mobile communication network according to the exemplary embodiments described herein. The processor 708 can be a special purpose or a general purpose computing device encoded with program code or software for performing the exemplary functions and/or features disclosed herein. According to exemplary embodiments of the present disclosure, the processor 708 can include a CPU. The CPU can be connected to the communications infrastructure including a bus, message queue, or network, multi-core message-passing scheme, for communicating with other components of the computing system 700, such as the memory 702, input device 704, the communications interface 706, and the I/O interface 712. The CPU can include one or more processors such as a microprocessor, microcomputer, programmable logic unit or any other suitable hardware computing devices as desired.

According to exemplary embodiments described herein, the combination of the memory 702 and the processor 708 can store and/or execute computer program code for performing the specialized functions described herein. The program code can be stored on a non-transitory computer readable medium, such as the memory devices 702 for the computing device 700, which may be memory semiconductors (e.g., DRAMs, etc.) or other tangible and non-transitory means for providing software to the computing device. For example, via any known or suitable service or platform, the program code can be deployed (e.g., streamed and/or downloaded) remotely from computing devices located on a local-area or wide-area network and/or in a cloud-computing arrangement or environment. In another example, the computer programs (e.g., computer control logic) or software may be stored in memory 702 resident on/in the computing device 700. The computer programs or software may be stored in a computer program product or non-transitory computer readable medium and loaded into the computing device 700 using any one or combination of a removable storage drive, an interface for internal or external communication, and a hard disk drive, where applicable. The computer programs or software, when executed, may enable the computing device to implement the present methods and exemplary embodiments discussed herein. Accordingly, such computer programs may represent controllers of the computing device.

The I/O interface 712 can be configured to receive the signal from the processor 708 and generate an output suitable for a peripheral device via a direct wired or wireless link. The I/O interface 712 can include a combination of hardware and software for example, a processor, circuit card, or any other suitable hardware device encoded with program code, software, and/or firmware for communicating with a peripheral device such as a display device, printer, audio output device, or other suitable electronic device or output type as desired.

The transmitting device 714 can be configured to receive data from the processor 708 and assemble the data into a data signal and/or data packets according to the specified communication protocol and data format of a peripheral device or remote device to which the data is to be sent. The transmitting device 714 can include any one or more of hardware and software components for generating and communicating the data signal over the communications infrastructure 716 and/or via a direct wired or wireless link to a peripheral or remote device. The transmitting device 714 can be configured to transmit information according to one or more communication protocols and data formats as discussed in connection with the receiving device 704.

According to exemplary embodiments described herein, the memory 702 and the device processor 708 can store and/or execute computer program code for performing the specialized functions described herein. It should be understood that the program code can be stored on a non-transitory computer usable medium, such as the memory devices for the system 700 (e.g., computing device), which may be memory semiconductors (e.g., DRAMs, etc.) or other tangible non-transitory means for providing software to the system 700. The computer programs (e.g., computer control logic) or software may be stored in memory devices (e.g., device memory 702) resident on/in the system 700.

The computer programs may also be received from external storage devices and/or network storage locations via a communications interface. Such computer programs, when executed, may enable the system 700 to implement the present methods and exemplary embodiments discussed herein. Accordingly, such computer programs may represent controllers of the system 700. Where the present disclosure is implemented using software, the software may be stored in a computer program product or non-transitory computer readable medium and loaded into the system 700 using any one or combination of a removable storage drive, an interface for internal or external communication, and a hard disk drive, where applicable.

In the context of exemplary embodiments of the present disclosure, a processor can include one or more modules or engines configured to perform the functions of the exemplary embodiments described herein. Each of the modules or engines may be implemented using hardware and, in some instances, may also utilize software, such as corresponding to program code and/or programs stored in memory. In such instances, program code may be interpreted or compiled by the respective processors (e.g., by a compiling module or engine) prior to execution. For example, the program code may be source code written in a programming language that is translated into a lower level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling the system 700 to perform the functions disclosed herein. It will be apparent to persons having skill in the relevant art that such processes result in the system 700 being a specially configured computing device uniquely programmed to perform the functions of the exemplary embodiments described herein.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A method for generating a feature vector for malware, the method comprising:
   storing, in memory of a computing device, program code for a trained neural network that produces embedded representations for antivirus scan data;
   executing, by a processor of the computing device, the program code for the trained neural network, the neural network causing the computing device to be configured to perform the operations of:
   (a) receiving an antivirus scan report (AVSR) for a malware file, the AVSR having a label including plural tokens that identify an antivirus product and attributes of the malware file;
   (b) normalizing each label in the AVSR by separating each label into a sequence of tokens including a set of token strings;
   (c) generating an input sequence for the malware file by embedding a first token and plural second tokens from the AVSR, wherein the first token identifies a start of the input sequence and each second token corresponds to the AVSR of the malware file;

(d) inputting the input sequence into a neural model for producing antivirus scan data; and (e) outputting the antivirus scan data produced by the neural model as one or more feature vectors.

2. The method of claim 1, wherein step (b) comprises:

inserting, by the computing device, bracket tokens and pad tokens into the at least one normalized label based on at least the identified antivirus product;

separating, by the computing device, each token string in the at least one normalized label into individual characters;

bracketing, by the computing device, the individual characters of each token string in the at least one normalized label with second tokens; and mapping, by the computing device, each bracketed token string, the first token, and pad token in the at least one normalized label to a numeric representation.

3. The method of claim 1, wherein, for step (c), each label includes Z token embeddings and is arranged at a fixed location within the input sequence, where L is a maximum length of each label.

4. The method of claim 1, comprising:

replacing, by the computing device, any unselected plural second tokens that are identical to the randomly selected tokens with a mask token.

5. The method of claim 4, comprising:

when an $i^{th}$ token in the input sequence is selected inputting, by the computing device, a final hidden state $T_i$ to a first feed-forward neural network; and computing, by the computing device, log probabilities on an output of the feed-forward neural network using an adaptive softmax approximation.

6. The method of claim 5, comprising:

predicting, by the computing device, withheld tokens in each label of the input sequence using plural second tokens in a current label and the input sequence that were not randomly selected for withholding.

7. The method of claim 6, wherein the computing device uses a long short-term memory decoder for the step of predicting withheld tokens, the method comprising:

inputting, by the computing device, to the LSTM decoder a token identifying the malware product that produced a withheld token to be processed.

8. The method of claim 7, comprising:

iteratively performing, by the computing device, predicting withheld tokens and inputting the token identifying the malware product for L timesteps or until an end token is generated, where L is a maximum length of each label; and at each time step:

passing, by the computing device, one or more outputs of the LSTM decoder are to a second feed-forward neural network; and computing, by the computing device, log probabilities on an output of the second feed-forward neural network using the adaptive softmax approximation.

9. The method of claim 1, comprising:

computing, by the computing device, for one or more batches including plural AVSR vectors having predicted hidden states, a Multiple Negative Ranking loss, each batch including k pairs of AVSR vectors;

a first AVSR vector in each pair is randomly sampled from the dataset; and a second AVSR vector in each pair has a same malware classification as the first AVSR vector.

10. The method of claim 9, comprising:

inputting, by the computing device, the first AVSR vector and the second AVSR vector of each pair, separately, into two neural models for embedding tokens from AVSRs, the two pre-trained models having shared weights.

11. The method of claim 1, wherein the trained neural network is trained by a process including:

randomly selecting for each AVSR vector in the input sequence, a specified number of the plural second tokens in the input sequence for withholding;

predicting for each AVSR vector in the input sequence, a hidden state of each second token that was not randomly selected in the input sequence;

computing for one or more batches including plural AVSR vectors having predicted hidden states, a Multiple Negative Ranking Loss; and generating a dataset of AVSR vectors for classifying malware data.

12. A system for generating a feature vector for malware, the system comprising:

memory configured to store program code for generating a neural network that produces embedded representations for antivirus scan data;

a receiver configured to receive an antivirus scan report (AVSR) for a malware file, the AVSR having at least one label including plural tokens that identify an antivirus product and attributes of the malware file; and a processor configured to execute the program code for generating pre-trained AVSR models, the program code causing the processor device to be configured to:

(a) normalize each label in the AVSR by separating each label into a sequence of tokens including a set of token strings;

(b) generate an input sequence for the malware file by embedding a first token and plural second tokens from the AVSR, wherein the first token identifies a start of the input sequence and each second token corresponds to the AVSR of the malware file;

(c) input the input sequence into a neural model for producing antivirus scan data; and (d) outputting the antivirus scan data produced by the neural model as one or more feature vectors.

13. The system of claim 12, wherein for step (a) the processor is configured to:

insert bracket tokens and pad tokens into the at least one normalized label based on at least the identified antivirus product;

separate each token string in the at least one normalized label into individual characters;

bracket the individual characters of each token string in the at least one normalized label with second tokens; and map each bracketed token name, first token, and pad token in the at least one normalized label to a numeric representation.

14. The system of claim 12, wherein, for step (b), each label includes L token embeddings and is arranged at a fixed location within the input sequence, where L is a maximum length of each label.

15. The system of claim 12, wherein the processor is configured to:

replace any unselected plural second tokens that are identical to the randomly selected tokens with a mask token.

16. The system of claim 15, wherein the processor is configured to:

when an $i^{th}$ token in the input sequence is selected:
input a final hidden state $T_i$ to a first feed-forward neural network; and
compute log probabilities on an output of the feed-forward neural network using an adaptive softmax approximation.

17. The system of claim 16, wherein the processor is configured to:
predict withheld tokens in each label of the input sequence using plural second tokens in a current label and the input sequence that were not randomly selected for withholding.

18. The system of claim 17, wherein via the program code, the processor is configured with a long short-term memory (LSTM) decoder to predict withheld tokens, the processor being further configured to:
input to the LSTM decoder a token identifying the malware product that produced a withheld token to be processed.

19. The system of claim 18, wherein the processor is configured to:
iteratively perform predicting withheld tokens and inputting the token identifying the malware product for L timesteps or until an end token is generated, where L is a maximum length of each label; and
at each time step:
pass one or more outputs of the LSTM decoder are to a second feed-forward neural network; and
compute log probabilities on an output of the second feed-forward neural network using the adaptive softmax approximation.

20. The system of claim 12, wherein the program code causes the processor device to be configured to:
compute, for one or more batches including plural AVSR vectors having predicted hidden states, a Multiple Negative Ranking loss;
wherein each batch includes k pairs of AVSR vectors;
a first AVSR vector in each pair is randomly sampled from the dataset; and
a second AVSR vector in each pair has a same malware classification as the first AVSR vector.

21. The system of claim 20, wherein the processor is further configured to:
input the first AVSR vector and the second AVSR vector of each pair, separately, into two neural models having shared weights.

22. The system of claim 12, wherein the program code causes the processor to initially train the trained neural network, the processor being configured to:
receive a second input sequence of training data associated with a second malware files, wherein a third token of the second input sequence identifies a start of the input sequence and each fourth token of the second input sequence corresponds to one of the plural AVSRs in the second malware file;
randomly select for each AVSR vector in the second input sequence, a specified number of the plural fourth tokens in the second input sequence for withholding;
predict for each AVSR vector in the second input sequence, a hidden state of each fourth token that was not randomly selected in the second input sequence;
compute for one or more batches including plural AVSR vectors having predicted hidden states, a Multiple Negative Ranking loss; and
generate a dataset of AVSR vectors for classifying malware data.

23. A non-transitory computer readable medium encoded with program code for generating pre-trained AVSR models, when placed in communicable contact with a computer processor, the program code causing the processor to be configured to perform an operation comprising:
(a) receiving an antivirus scan report (AVSR) for a malware file, the AVSR having at least one label including plural tokens that identify an antivirus product and attributes of the malware file;
(b) normalizing each label in the AVSR by separating the label into a sequence of tokens including a set of token strings;
(c) generating an input sequence for the malware file by embedding a first token and plural second tokens from the AVSR, wherein the first token identifies a start of the input sequence and each second token corresponds to the AVSR of the malware file;
(d) inputting the input sequence into a trained neural model for producing antivirus scan data; and
(e) outputting the antivirus scan data produced by the neural model as one or more feature vectors.

24. A method for building a neural network model for generating feature vectors for malware that are used for classifying malware data, the method comprising:
storing, in memory of a computing device, program code for generating a neural network that produces embedded representations for antivirus scan data;
executing, by a processor of the computing device, the program code for generating the neural network, the neural network causing the computing device to be configured to perform the operations of:
(a) receiving an antivirus scan report (AVSR) for a malware file, the AVSR having a label including plural tokens that identify an antivirus product and attributes of the malware file;
(b) randomly selecting, for each AVSR vector in the input sequence, a specified number of the plural second tokens in the input sequence for withholding;
(c) predicting, for each AVSR vector in the input sequence, a hidden state of each second token that was not randomly selected in the input sequence;
(d) computing, for one or more batches including plural AVSR vectors having predicted hidden states, a Multiple Negative Ranking loss; and
(e) generating a dataset of AVSR vectors for classifying malware data.

* * * * *